(12) United States Patent
Yang et al.

(10) Patent No.: US 11,153,724 B2
(45) Date of Patent: Oct. 19, 2021

(54) METHOD, DEVICE AND SYSTEM FOR PROCESSING MULTICAST GROUP INFORMATION, AND COMPUTER-READABLE STORAGE MEDIUM

(71) Applicant: XI'AN ZHONGXING NEW SOFTWARE CO. LTD., Shaanxi (CN)

(72) Inventors: Kun Yang, Shaanxi (CN); Hao Wu, Shaanxi (CN)

(73) Assignee: XI'AN ZHONGXING NEW SOFTWARE CO. LTD., Shaanxi (CN)

( * ) Notice: Subject to any disclaimer, the term of this patent is extended or adjusted under 35 U.S.C. 154(b) by 0 days.

(21) Appl. No.: 16/770,141

(22) PCT Filed: Nov. 30, 2018

(86) PCT No.: PCT/CN2018/118735
§ 371 (c)(1),
(2) Date: Jun. 5, 2020

(87) PCT Pub. No.: WO2019/109875
PCT Pub. Date: Jun. 13, 2019

(65) Prior Publication Data
US 2021/0176604 A1    Jun. 10, 2021

(30) Foreign Application Priority Data
Dec. 5, 2017   (CN) .......................... 201711270730.3

(51) Int. Cl.
*H04H 20/71*     (2008.01)
*G08C 17/00*     (2006.01)
(Continued)

(52) U.S. Cl.
CPC .................................. *H04W 4/08* (2013.01)

(58) Field of Classification Search
CPC ....................................................... H04W 4/08
(Continued)

(56) References Cited

U.S. PATENT DOCUMENTS

2014/0369251 A1   12/2014 Zhang
2016/0007138 A1    1/2016 Palanisamy et al.
(Continued)

FOREIGN PATENT DOCUMENTS

CN    103200209 A    7/2013
CN    106664516 A    5/2017
(Continued)

OTHER PUBLICATIONS

WIPO, International Search Report dated Feb. 1, 2019.
(Continued)

*Primary Examiner* — Mark G. Pannell
(74) *Attorney, Agent, or Firm* — Li & Cai Intellectual Property (USA) Office (57) ABSTRACT

Provided are a method, a device and a system for processing multicast group information. The method includes: receiving, by a first underlying network element, multicast group information allocated by a CSE; and creating or updating, by the first underlying network element, local multicast group information according to the received multicast group information.

19 Claims, 4 Drawing Sheets

---

310 — a CSE allocates multicast group information

320 — the CSE transmits the allocated multicast group information to an underlying network element through a multicast service request, so as to trigger the underlying network element to create or update local multicast group information (51) Int. Cl.
 *H04B 7/00* (2006.01)
 *H04W 4/08* (2009.01)
(58) Field of Classification Search
 USPC .......................................................... 370/312
 See application file for complete search history.

(56) References Cited

U.S. PATENT DOCUMENTS

2018/0049156 A1* 2/2018 Laha ...................... H04W 76/40
2018/0092133 A1* 3/2018 Starsinic ................. H04W 4/08
2018/0310141 A1   10/2018 Yin et al.

FOREIGN PATENT DOCUMENTS

CN         106888437 A    6/2017
WO    WO 2016161242 A1   10/2016

OTHER PUBLICATIONS

European Patent Office, extended European search reported dated Jul. 23, 2021 corresponding to EP Application No. 188852226.3.
ETSI, "oneM2M; 3GPP Release 13 Interworking"; ETSI TR 118524 V2.0.0 (Sep. 26, 2016), pp. 1-50.

* cited by examiner

METHOD, DEVICE AND SYSTEM FOR PROCESSING MULTICAST GROUP INFORMATION, AND COMPUTER-READABLE STORAGE MEDIUM

CROSS-REFERENCE TO RELATED APPLICATIONS

This is a National Phase Application filed under 35 U.S.C. 371 as a national stage of PCT/CN2018/118735, filed on Nov. 30, 2018, an application claiming the priority of Chinese Patent Application No. 201711270730.3, filed on Dec. 5, 2017, the contents of which are incorporated herein in their entirety by reference.

TECHNICAL FIELD

The present disclosure relates to communication technology, and in particular, to a method, a device, and a system for processing multicast group information.

BACKGROUND oneM2M is an international standard organization dedicated to M2M (machine-to-machine communication) and IoT (Internet of Things) under the ETSI (European Telecommunications Standards Institute), and aims to develop an IoT architecture and related technical specifications to ultimately achieve machine-to-machine communication across different departments and industries.

Figure 1:
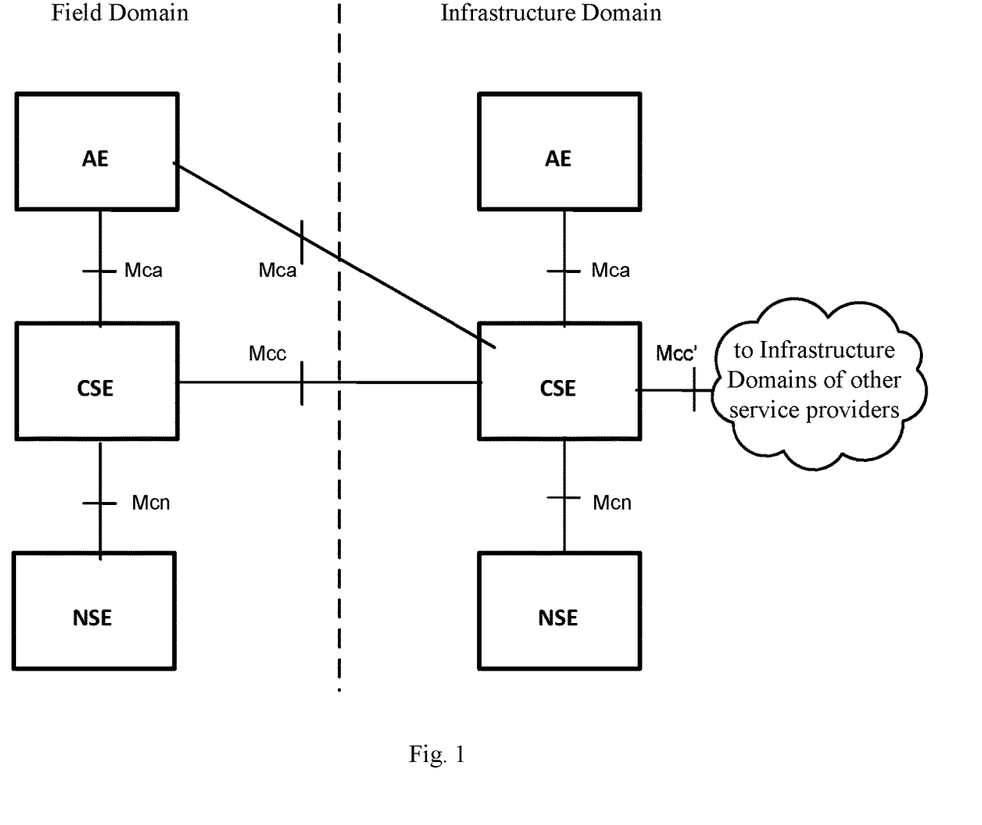
FIG. 1 is a schematic diagram of a functional architecture of oneM2M.

FIG. 1 shows a functional architecture of oneM2M, which includes the following functional entities:

Application Entity (AE): an AE is an entity in an application layer that implements an M2M application service logic. Each application service logic can be resident in a plurality of M2M nodes and/or more than once in a single M2M node. Each execution instance of an application service logic is termed an "Application Entity" (AE) and is identified with a unique AE-ID. Examples of the AEs include instances of a fleet tracking application, a remote blood sugar monitoring application, a power metering application, and a controlling application. In communication with 3GPP, the AE can act as an Application Server (AS) to interact with a Services Capability Server (SCS).

Common Services Entity (CSE): a CSE represents an instantiation of a set of common service functions in an M2M environment. Such service functions are exposed to other entities through Mca and Mcc reference points. Mcn reference points are used to access an Underlying Network Service Entity. Each CSE is identified with a unique CSE-ID.

Examples of the service functions provided by the CSEs include: data management, device management, device management, M2M service subscription management and location services. Such "subfunctions" provided by the CSEs may be conceptualized as Common Services Functions (CSFs) in terms of logic and information function. In communication with 3GPP, the CSE may act as an SCS to interact with a Service Capability Exposure Function (SCEF) via an Application Program Interface (API).

Underlying Network Services Entity (underlying NSE): an NSE provides services from an underlying network to the CSE. Examples of such services include device management, location services, and device triggering. In communication with 3GPP, the NSE may act as an SCEF, and the CSE may be connected to a 3GPP network through the SCEF, so as to use the services provided by the 3GPP network.

In application scenarios of the IoT, the number of terminal devices is much greater than that of traditional mobile phone terminals, for example, terminals with the same or similar characteristics provided by the same IoT service provider are deployed in one or several fixed areas, for example, forest fire monitoring devices of a Forest Management Center are deployed in a forest, or, remote meter reading devices of the State Grid are deployed in a neighborhood.

In the above scenarios, the same or similar devices of the same service provider are very similar in interaction with a network server, for example, the data sent by the network server to all the devices are the same in a case of remotely upgrading software of the terminal devices. In such case, if processed according to relevant flows, the data needs to be transmitted to the devices one by one. A large number of signaling interactions are generated in the whole transmission process, for example, every time a request message is sent, a response message to the request is generated at the same time between an application and an underlying network. In addition, the interaction between the underlying network with the devices also generates a large amount of signaling. Considering that the existing underlying networks, such as a 3GPP network, can provide multimedia broadcast multicast service (MBMS) to transmit data to the connected devices by broadcast with no need of feedback from the devices, it is possible for an application to establish a mechanism for using the services provided by the 3GPP network to send a request message to a group of same or similar devices, in order to reduce signaling overhead and save network resources.

However, in the related art, in a scenario where a multicast mechanism is used for fanning-out group operations to members, the CSE stores multicast group information, which belongs to an accessed group and is related to a multicast group; meanwhile, a multimedia broadcast multicast service gateway (MBMS GW) in a 3GPP network allocates multicast group information to the multicast group, which results in a possible conflict between the multicast group information stored in the CSE and the multicast group information allocated by the MBMS GW.

SUMMARY

The embodiments of the present disclosure provide a method for processing multicast group information, including: receiving, by a first underlying network element, multicast group information allocated by a CSE; and creating or updating, by the first underlying network element, local multicast group information according to the received multicast group information.

The embodiments of the present disclosure further provide a device for processing multicast group information, including: a receiving module configured to receive multicast group information allocated by a CSE; and a processing module configured to create or update local multicast group information according to the received multicast group information.

With the above technical solutions, the first underlying network element may locally store the multicast group information allocated by the CSE, and is not limited to storing the multicast group information configured by other underlying network elements.

The embodiments of the present disclosure further provide a method for processing multicast group information, including: receiving, by a second underlying network element, multicast group information allocated by a CSE; and configuring, by the second underlying network element, the multicast group information for a corresponding multicast group according to the received multicast group information.

The embodiments of the present disclosure further provide a device for processing multicast group information, including: a receiving module configured to receive multicast group information allocated by a CSE; and a processing module configured to configure the multicast group information for a corresponding multicast group according to the received multicast group information.

The above technical solutions enable the second underlying network element to perform configuration according to the multicast group information allocated by the CSE, so as to avoid a conflict between the multicast group information allocated by the CSE and the multicast group information allocated by the underlying network element.

The embodiments of the present disclosure further provide a method for processing multicast group information, including: allocating, by a CSE, multicast group information; and transmitting, by the CSE, the allocated multicast group information to an underlying network element through a multicast service request, so as to trigger the underlying network element to create or update local multicast group information.

The embodiments of the present disclosure further provide a device for processing multicast group information, including: a processing module configured to allocate multicast group information; and a transmitting module configured to transmit the allocated multicast group information to an underlying network element through a multicast service request, so as to trigger the underlying network element to create or update local multicast group information.

The above technical solutions enable the underlying network element to receive the multicast group information allocated by the CSE, so as to store and configure the multicast group information.

The embodiments of the present disclosure further provide a system for processing multicast group information, including the above-mentioned devices for processing multicast group information.

The embodiments of the present disclosure further provide a device for processing multicast group information, including a memory, a processor, and a computer program stored in the memory and capable of being executed on the processor, and the processor performs any one of the above methods when executing the computer program.

The embodiments of the present disclosure further provide a computer-readable storage medium having a computer program stored therein, and when the computer program is executed by a processor, the processor performs any one of the above methods.

The other technical features and advantages of the present disclosure will be illustrated below in the description, and may become partially obvious through the Description, or be understood by enabling the present disclosure. The objectives and the other advantages of the present disclosure may be realized and attained with the structures particularly pointed out in the description, claims and drawings.

BRIEF DESCRIPTION OF THE DRAWINGS

The accompanying drawings are intended to provide further understanding of the technical solutions of the present disclosure, and are incorporated in and constitute a part of the specification. The drawings, together with the embodiments of the present disclosure, are intended to illustrate the technical solutions of the present disclosure, but the technical solutions of the present disclosure are not limited thereto. In the drawings.

DETAILED DESCRIPTION

In order to make the objectives, technical solutions and advantages of the present disclosure clearer, the embodiments of the present disclosure are described in detail below with reference to the accompanying drawings. It should be noted that the embodiments and the technical features thereof in the present application may be arbitrarily combined with one another if no conflict is incurred.

Embodiment One

Figure 2:
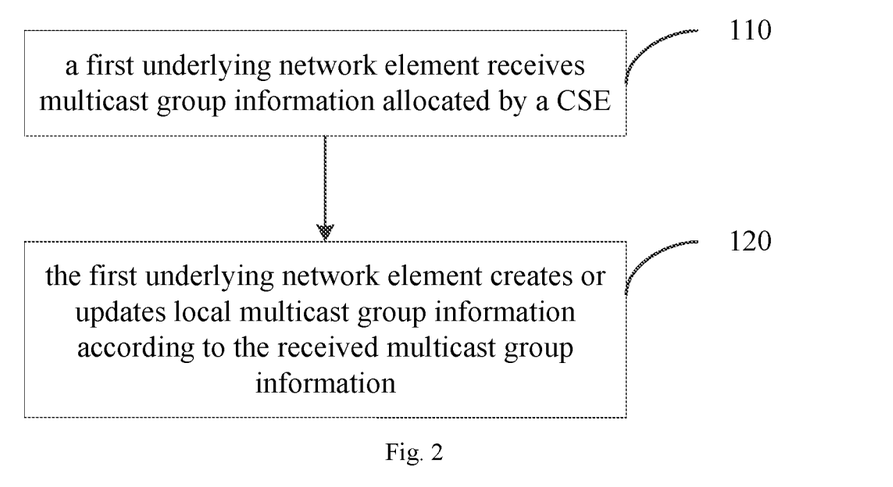
FIG. 2 is a flowchart illustrating a method for processing multicast group information at a broadcast multicast-service center (BM-SC) side according to Embodiment One of the present disclosure.

As shown in FIG. 2, a method for processing multicast group information according to Embodiment One includes steps 110 to 120.

At step 110, a first underlying network element receives multicast group information allocated by a CSE.

In the embodiment, the first underlying network element receives the multicast group information transmitted by an underlying NSE. The multicast group information is allocated and transmitted to the NSE by the CSE where a group is located, and includes a multicast address, or a multicast address and an address type. In an example, the CSE sends a Group Message Request, which carries the multicast group information and an External Group ID, to the NSE. An underlying network is configured with a mapping relationship between External Group IDs and Group IDs used on the underlying network.

At step 120, the first underlying network element creates or updates local multicast group information according to the received multicast group information.

In the embodiment, a multicast group to which the multicast group information belongs has been created locally on the first underlying network element, for example, during a process that a CSE where members are located joins a multicast group according to a request message, the multicast group is created on a relevant network element of an underlying network and is assigned a corresponding ID. However, multicast group information of the multicast group may have been stored by the first underlying network element, or may not. If the multicast group information of the multicast group has been stored, the first underlying network element updates the local multicast group information of the multicast group according to the received multicast group information. If the multicast group information of the multicast group has not been stored yet, the first underlying network element creates local multicast group information according to the received multicast group information, that is, storing the received multicast group information as the multicast group information of the multicast group.

In the embodiment, after receiving the multicast group information allocated by the CSE, the first underlying network element further transmits the multicast group information to a second underlying network element, so that the second underlying network element may complete configuration of the multicast group information.

In the embodiment, the first underlying network element is a BM-SC, and the second underlying network element is an MBMS GW. The BM-SC may trigger a session procedure with the MBMS GW to transmit the multicast group information to the MBMS GW through a corresponding session request.

In other embodiments, if the method is implemented on other underlying networks, the first underlying network element may be a network element on the underlying network in charge of storing multicast group information, and the second underlying network element may be a network element on the underlying network in charge of configuring multicast group information.

In an embodiment, during one processing process, the BM-SC is triggered to create or update the multicast group information, and the MBMS GW is simultaneously triggered to configure the multicast group information, and the processing process is as follows: the BM-SC receives a first multicast service request, which carries the multicast group information, sent by the NSE; the BM-SC creates or updates local multicast group information of a corresponding multicast group according to the multicast group information in the first multicast service request, and transmits the multicast group information to the MBMS GW through a second multicast service request; and after receiving a response of the MBMS GW to the second multicast service request, the BM-SC sends a response to the first multicast service request to the NSE.

The first multicast service request is an Activate MBMS Bearer Request, which further carries a Temporary Mobile Group Identity (TMGI) corresponding to the multicast group information, and the BM-SC may identify a multicast group corresponding to the multicast group information according to the TMGI. The second multicast service request is a Session Update Request or a Session Start Request, which further carries the TMGI and a Flow ID corresponding to the multicast group information, and the MBMS GW may identify the multicast group corresponding to the multicast group information according to the TMGI and the Flow ID.

In another embodiment, during one processing process, the BM-SC is triggered to create or update the multicast group information, and the MBMS GW is separately triggered to configure the multicast group information, and the processing process is as follows: the BM-SC receives a third multicast service request, which carries the multicast group information, sent by the NSE; the BM-SC creates or updates local multicast group information of a corresponding multicast group according to the multicast group information in the third multicast service request, and returns a response to the third multicast service request to the NSE; after returning the response to the third multicast service request to the NSE, the BM-SC receives a fourth multicast service request sent by the NSE, and transmits the local multicast group information to the MBMS GW through a fifth multicast service request; and after receiving a response of the MBMS GW to the fifth multicast service request, the BM-SC sends a response to the fourth multicast service request to the NSE.

The third multicast service request is an Allocate TMGI Request, which further carries a total number of requested TMGIs, and the BM-SC may allocate TMGIs according to the Allocate TMGI Request and return to the NSE through a response. The fourth multicast service request is an Activate MBMS Bearer Request, which carries a TMGI corresponding to the multicast group information, and the fifth multicast service request is a Session Update Request or a Session Start Request, which further carries the TMGI and a Flow ID corresponding to the multicast group information.

It should be noted that the specific requests (or request messages) used as the above service requests are not limited by the present disclosure, and may be different in different systems, which also applies to the requests in the other embodiments.

Figure 3:
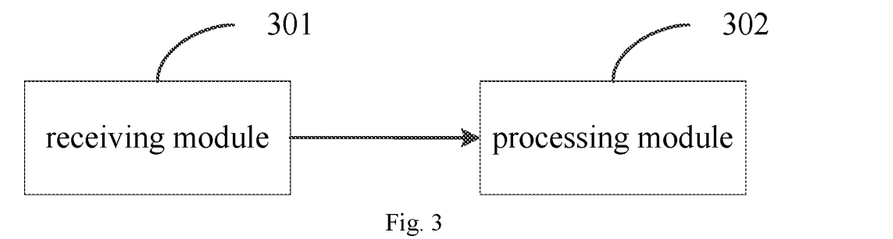
FIG. 3 is a block diagram of a device for processing multicast group information at the BM-SC side according to Embodiment One of the present disclosure.

As shown in FIG. 3, the Embodiment One further provides a device for processing multicast group information, including a receiving module 301 and a processing module 302.

The receiving module 301 is configured to receive multicast group information allocated by a CSE.

The processing module 302 is configured to create or update local multicast group information according to the received multicast group information.

In the embodiment, the processing module 302 is further configured to transmit the multicast group information to a second underlying network element, so that the second underlying network element may complete configuration of the multicast group information.

In the embodiment, the device is disposed at a BM-SC, and the second underlying network element is an MBMS GW; and a step in which the processing module 302 transmits the multicast group information to the second underlying network element includes: the processing module 302 triggers a session procedure with the MBMS GW to transmit the multicast group information to the MBMS GW through a corresponding session request.

In the embodiment, a step in which the receiving module 301 receives the multicast group information allocated by the CSE includes: the receiving module 301 receives the multicast group information transmitted by an underlying NSE, and the multicast group information is allocated and transmitted to the NSE by the CSE where a group is located.

The above modules of the embodiment may perform corresponding processing processes of the method of the embodiment, which is not described here in detail.

With the technical solutions of the embodiment, the first underlying network element may locally store the multicast group information allocated by the CSE, and is not limited to storing the multicast group information configured by other underlying network elements, which avoids a possible conflict between the multicast group information stored by the CSE and the multicast group information allocated by the MBMS GW.

Embodiment Two

Figure 4:
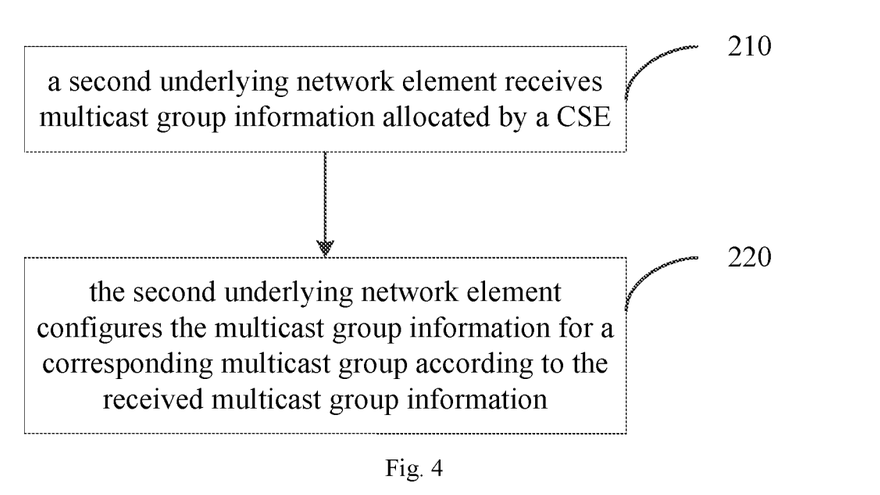
FIG. 4 is a flowchart illustrating a method for processing multicast group information at an MBMS GW side according to Embodiment Two of the present disclosure.

As shown in FIG. 4, a method for processing multicast group information according to the Embodiment Two includes steps 210 to 220.

At step 210, a second underlying network element receives multicast group information allocated by a CSE.

In the embodiment, a first underlying network element is a BM-SC, and the second underlying network element is an MBMS GW. The MBMS GW receives a session request sent by the BM-SC through a session procedure with the BM-SC, and the session request carries the multicast group information which includes a multicast address, or a multicast address and an address type.

In the embodiment, the session request is a Session Update Request or a Session Start Request, which further carries a TMGI and a Flow ID corresponding to the multicast group information.

At step 220, the second underlying network element configures the multicast group information for a corresponding multicast group according to the received multicast group information.

After configuring the multicast group information for the corresponding multicast group, the MBMS GW sends a response to the Session Update Request or the Session Start Request to the BM-SC.

Figure 5:
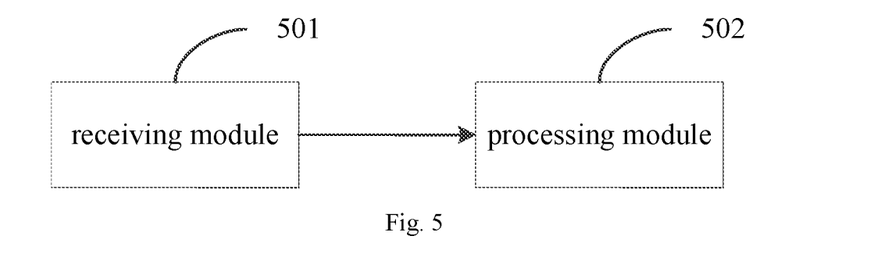
FIG. 5 is a block diagram of a device for processing multicast group information at the MBMS GW side according to Embodiment Two of the present disclosure.

As shown in FIG. 5, the Embodiment Two further provides a device for processing multicast group information, including a receiving module 501 and a processing module 502.

The receiving module 501 is configured to receive multicast group information allocated by a CSE.

The processing module 502 is configured to configure the multicast group information for a corresponding multicast group according to the received multicast group information.

In the embodiment, the CSE is the CSE where a group is located, and the multicast group information includes a multicast address, or a multicast address and an address type.

In the embodiment, the device is disposed at an MBMS GW, and a step in which the receiving module 501 receives the multicast group information allocated by the CSE includes: the receiving module 501 receives a session request, which carries the multicast group information, sent by a BM-SC through a session procedure with the BM-SC.

The above modules of the embodiment may perform corresponding processing processes of the method of the embodiment, which is not described here in detail.

The technical solutions of the embodiment enable the second underlying network element to perform configuration according to the multicast group information allocated by the CSE, so as to avoid a possible conflict between the multicast group information allocated by the CSE and the multicast group information allocated by an underlying network element.

Embodiment Three

Figure 6:
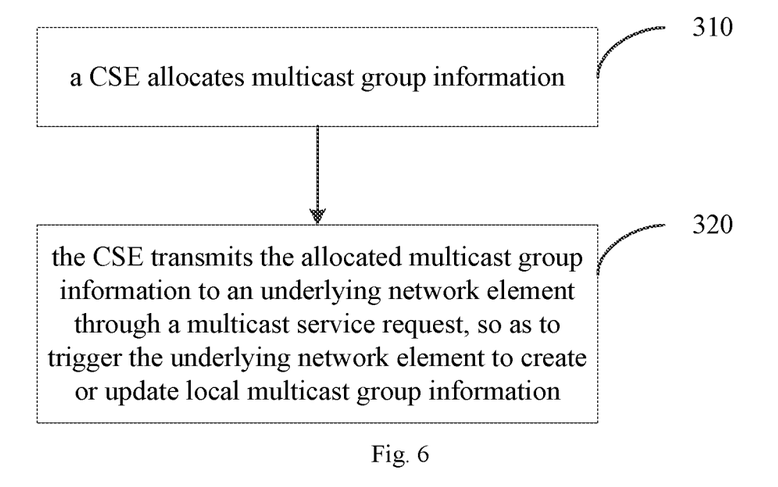
FIG. 6 is a flowchart illustrating a method for processing multicast group information at a CSE side according to Embodiment Three of the present disclosure.

As shown in FIG. 6, the Embodiment Three provides a method for processing multicast group information, including steps 310 to 320.

At step 310, a CSE allocates multicast group information.

In the embodiment, the CSE is a CSE where a group is located, and the multicast group information includes a multicast address, or a multicast address and an address type.

At step 320, the CSE transmits the allocated multicast group information to an underlying network element group through a multicast service request, so as to trigger the underlying network element to create or update local multicast group information.

In the embodiment, the CSE sends a Group Message Request, which carries the multicast group information, to an underlying NSE, and the multicast group information is transmitted to the underlying network element through the NSE. The Group Message Request further carries an External Group ID.

Figure 7:
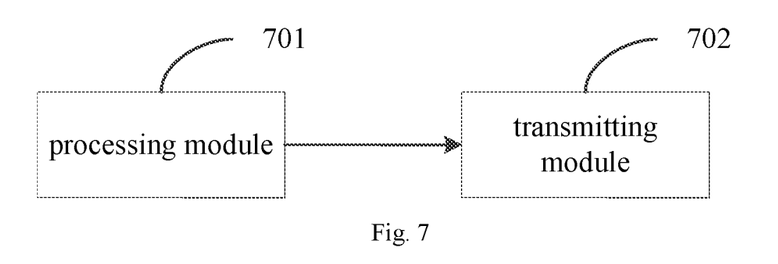
FIG. 7 is a block diagram of a device for processing multicast group information at the CSE side according to Embodiment Three of the present disclosure.

As shown in FIG. 7, the Embodiment Three further provides a device for processing multicast group information, including a processing module 701 and a transmitting module 702.

The processing module 701 is configured to allocate multicast group information.

The transmitting module 702 is configured to transmit the allocated multicast group information to an underlying network element through a multicast service request, so as to trigger the underlying network element to create or update local multicast group information.

In the embodiment, the device is disposed at the CSE where a group is located, and a step in which the transmitting module 702 transmits the allocated multicast group information to the underlying network element through the multicast service request includes: the transmitting module 702 sends a Group Message Request, which carries the multicast group information, to an underlying NSE, so as to transmit the multicast group information to the underlying network element through the NSE. The Group Message Request further carries an External Group ID.

The above modules of the embodiment may perform corresponding processing processes of the method of the embodiment, which is not described here in detail.

The technical solutions of the embodiment enable the underlying network element to receive the multicast group information allocated by the CSE, so as to store and configure the multicast group information.

The present application further provides a system for processing multicast group information, including the devices for processing multicast group information according to the above Embodiment One to Embodiment Three.

Embodiment Four

The Embodiment Four provides an example of a method for processing multicast group information, including steps One to Eleven.

At step One, a CSE where a group is located creates a multicast group and multicast group resource parameters according to multicast capability of a CSE where members are located.

Specifically, the CSE where the group is located allocates a multicast type according to the multicast capability of the CSE where the members are located, and the multicast type includes: a 3GPP MBMS group (3GPP_MBMS_group).

The CSE where the group is located allocates a multicast address parameter (MulticastAddress) and an address type parameter (AddressType) to a Member Resource in the multicast group.

The CSE where the group is located allocates a virtual fanout uniform identify to a fanout target (FanoutTarget) of multicast group.

The CSE where the group is located establishes a mapping relationship between the multicast address and the virtual fanout uniform identity according to a Member Resource identity.

At step Two, the CSE where the group is located sends a create local multicast group resource request message to the CSE where the members are located.

In the embodiment, the create local multicast group resource request message includes the multicast address parameter, the address type parameter, and the fanout target of multicast group which is set as the virtual fanout uniform identity.

At step Three, the CSE where the members are located creates a local multicast group resource and joins the multicast group according to the create local multicast group resource request message.

At step Four, the CSE where the members are located feeds a creating local multicast group (localMulticastGroup) resource response message back to CSE where the group is located.

At step Five, the CSE where the group is located creates multicast group information according to the creating local multicast group resource response message.

Specifically, the CSE where the group is located creates a value of the multicast address parameter and a value of the address type parameter according to the creating local multicast group resource response message, so as to create the multicast group information specifically in a resource <Group>, and the multicast group information includes: a multicast address, an address type, and a virtual fanout uniform identity.

At step Six, the CSE where the group is located sends a Group Message Request message to an NSE, the Group Message Request message carries an External Group ID, and the multicast address and the address type which are allocated by the CSE where the group is located.

At step Seven, the NSE sends an Activate MBMS Bearer Request message to a BM-SC.

Specifically, the Activate MBMS Bearer Request message includes: a TMGI, and the multicast address and the address type which are allocated by the CSE where the group is located.

At step Eight, the BM-SC triggers a session procedure with an MBMS GW.

When the BM-SC stores local multicast group information of a corresponding multicast group, the BM-SC replaces the originally stored local multicast group information with the received multicast group information, and sends a Session Update Request message, which carries the TMGI, a Flow ID, the multicast address and the address type, to the MBMS GW.

When the BM-SC does not store local multicast group information of a corresponding multicast group, the BM-SC stores the received multicast group information as the multicast group information of the corresponding multicast group, that is, creating local multicast group information. The BM-SC further sends a Session Start Request message, which carries the TMGI, the Flow ID, the multicast address and the address type, to the MBMS GW.

At step Nine, the MBMS GW configures Multicast Group Information for the corresponding multicast group according to the request message, and feeds a Session Update Response message or a Session Start Response message back to the BM-SC.

The above corresponding multicast group is a multicast group to which the received multicast group information belongs, and can be identified by the MBMS GW according to the TMGI and the Flow ID.

At step Ten, the BM-SC receives the Session Update Response message or the Session Start Response message from the MBMS GW, and feeds an Active MBMS Bearer Response message back to NSE.

At step Eleven, the NSE receives the Active MBMS Bearer Response message from the BM-SC, and feeds a Group Message Response message back to the CSE where the group is located.

Embodiment Five

The Embodiment Five provides another example of a method for processing multicast group information, including steps One to Fifteen.

The steps One to Five in the Embodiment Five and the steps One to Five in the Embodiment Four are implemented in similar ways, and therefore are not described in detail here.

At step Six, the CSE where the group is located sends an Allocate TMGI Request message to an NSE.

In the embodiment, the Allocate TMGI Request message includes: an External Group ID, and the multicast address and the address type which are allocated by the CSE where the group is located.

At step Seven, the NSE sends an Allocate TMGI Request message to a BM-SC.

In the embodiment, the Allocate TMGI Request message includes: a total number of requested TMGIs, and the multicast address and the address type which are allocated by the CSE where the group is located.

At step Eight, the BM-SC creates or updates local multicast group information according to the request, and feeds an Allocate TMGI Response message back to the NSE.

The way in the Embodiment Five of creating and updating local multicast group information by the BM-SC according to the requests, except for the Allocate TMGI Request message, may be the same as the way in the Embodiment Four, and thus will not be repeated here. Creating and updating the local multicast group information by the BM-SC may also be regarded as configuring multicast group information for a corresponding multicast group.

At step Nine, the NSE receives the Allocate TMGI Response message from the BM-SC, and feeds an Allocate TMGI Response message back to the CSE where the group is located.

At step Ten, the CSE where the group is located sends a Group Message Request message, which carries an External Group ID, to the NSE.

At step Eleven, the NSE sends an Active MBMS Bearer Request message, which carries a TMGI, to the BM-SC.

At step Twelve, the BM-SC sends a Session Update Request message or a Session Start Request message, which carries the TMGI, a Flow ID, the multicast address and the address type, to an MBMS GW.

If the BM-SC updates local multicast group information in step Eight, the BM-SC sends a Session Update Response message to the MBMS GW; and if the BM-SC creates local multicast group information in step Eight, the BM-SC sends a Session Start Request message.

At step Thirteen, the MBMS GW configures multicast group information for a corresponding multicast group according to the request message, and feeds a Session Update Response message or a Session Start Response message back to the BM-SC.

At step Fourteen, the BM-SC receives the Session Update Response message or the Session Start Response message from the MBMS GW, and feeds an Active MBMS Bearer Response message back to the NSE.

At step Fifteen, the NSE receives the Active MBMS Bearer Response message from the BM-SC, and feeds a Group Message Response message back to the CSE where the group is located.

It should be understood by those skilled in the art that the functional modules/units in all or some of the steps, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those skilled in the art, the term "computer storage media" includes volatile/nonvolatile and removable/non-removable media used in any method or technology for storing information (such as computer-readable instructions, data structures, program modules and other data). The computer storage media include, but are not limited to, RAMs, ROMs, EEPROMs, flash memories or other memory techniques, CD-ROMs, digital versatile disks (DVDs) or other optical discs, magnetic cassettes, magnetic tapes, magnetic disks or other magnetic storage devices, or any other media which can be used to store the desired information and can be accessed by a computer. In addition, it is well known by those skilled in the art that the communication media generally include computer-readable instructions, data structures, program modules or other data in a modulated data signal, such as a carrier wave or other transmission mechanism, and may include any information delivery media.

INDUSTRIAL APPLICABILITY

The technical solutions provided by the present disclosure may be applied to the technical field of communications, and avoids a possible conflict between the multicast group information stored by the CSE and the multicast group information allocated by the MBMS GW.

What is claimed is:

1. A method for processing multicast group information, comprising:
   receiving, by a first underlying network element, multicast group information allocated by a Common Services Entity (CSE); and
   creating or updating, by the first underlying network element, local multicast group information according to the received multicast group information.

2. The method of claim 1, wherein after the first underlying network element receives the multicast group information allocated by the CSE, the method further comprises:
   transmitting, by the first underlying network element, the multicast group information to a second underlying network element to allow the second underlying network element to complete configuration of the multicast group information.

3. The method of claim 2, wherein the first underlying network element is a broadcast multicast-service center (BM-SC), the second underlying network element is a multimedia broadcast multicast service gateway (MBMS GW), and the step in which the first underlying network element transmits the multicast group information to the second underlying network element comprises:
   triggering, by the BM-SC, a session procedure with the MBMS GW to transmit the multicast group information to the MBMS GW through a corresponding session request.

4. The method of claim 2, wherein the step in which the first underlying network element receives the multicast group information allocated by the CSE comprises:
   receiving, by the first underlying network element, the multicast group information transmitted by an underlying Network Services Entity (NSE),
   wherein the multicast group information is allocated and transmitted to the NSE by the CSE where a group is located.

5. The method of claim 4, wherein the step in which the first underlying network element receives the multicast group information transmitted by an underlying NSE comprises:
   receiving, by the first underlying network element, a third multicast service request carrying the multicast group information and sent by the NSE,
   the step in which the first underlying network element creates or updates the local multicast group information according to the received multicast group information comprises:
   creating or updating, by the first underlying network element, the local multicast group information of a corresponding multicast group according to the multicast group information in the third multicast service request,
   after the first underlying network element creates or updates the local multicast group information, the method further comprises:
   returning, by the first underlying network element, a response to the third multicast service request to the NSE, and
   the step in which the first underlying network element transmits the multicast group information to the second underlying network element comprises:
   receiving, by the first underlying network element, a fourth multicast service request from the NSE after returning the response to the third multicast service request to the NSE;
   transmitting, by the first underlying network element, the local multicast group information to the second underlying network element through a fifth multicast service request; and
   sending, by the first underlying network element, a response to the fourth multicast service request to the NSE after receiving a response of the second underlying network element to the fifth multicast service request.

6. The method of claim 5, wherein
   the third multicast service request is an Allocate TMGI Request, which further carries a total number of requested TMGIs;
   the fourth multicast service request is an Activate MBMS Bearer Request, which further carries a TMGI corresponding to the multicast group information; and
   the fifth multicast service request is a Session Update Request or a Session Start Request, which further carries the TMGI and a Flow ID corresponding to the multicast group information.

7. The method of claim 4, wherein the step in which the first underlying network element receives the multicast group information transmitted by an underlying NSE comprises:

receiving, by the first underlying network element, a first multicast service request carrying the multicast group information and sent by the NSE, the step in which the first underlying network element creates or updates the local multicast group information according to the received multicast group information comprises:

creating or updating, by the first underlying network element, the local multicast group information of a corresponding multicast group according to the multicast group information in the first multicast service request, the step in which the first underlying network element transmits the multicast group information to the second underlying network element comprises:

transmitting, by the first underlying network element, the multicast group information to the second underlying network element through a second multicast service request after receiving the first multicast service request, and after the first underlying network element transmits the multicast group information to the second underlying network element, the method further comprises:

sending, by the first underlying network element, a response to the first multicast service request to the NSE after receiving a response of the second underlying network element to the second multicast service request.

8. The method of claim 7, wherein the first multicast service request is an Activate MBMS Bearer Request, which further carries a Temporary Mobile Group Identity (TMGI) corresponding to the multicast group information; and the second multicast service request is a Session Update Request or a Session Start Request, which further carries the TMGI and a Flow ID corresponding to the multicast group information.

9. The method of claim 1, wherein the multicast group information comprises a multicast address, or a multicast address and an address type.

10. A computer-readable storage medium, comprising a computer program which, when executed by one or more processors, cause the one or more processors to perform the method of claim 1.

11. A method for processing multicast group information, comprising:

receiving, by a second underlying network element, multicast group information allocated by a Common Services Entity (CSE); and configuring, by the second underlying network element, the multicast group information for a corresponding multicast group according to the received multicast group information.

12. The method of claim 11, wherein the CSE is a CSE where a group is located, and the multicast group information comprises a multicast address, or a multicast address and an address type.

13. The method of claim 11, wherein the second underlying network element is a multimedia broadcast multicast service gateway (MBMS GW), and the step in which the second underlying network element receives the multicast group information allocated by the CSE comprises:

receiving, by the MBMS GW, a session request carrying the multicast group information and sent by a broadcast multicast-service center (BM-SC) through a session procedure with the BM-SC.

14. The method of claim 13, wherein the session request is a Session Update Request or a Session Start Request, which further carries a Temporary Mobile Group Identity (TMGI) and a Flow ID corresponding to the multicast group information; and after configuring the multicast group information for the corresponding multicast group, the method further comprises:

sending, by the MBMS GW, a response to the Session Update Request or the Session Start Request to the BM-SC.

15. A computer-readable storage medium, comprising a computer program which, when executed by one or more processors, cause the one or more processors to perform the method of claim 11.

16. A method for processing multicast group information, comprising:

allocating, by a Common Services Entity (CSE), multicast group information; and transmitting, by the CSE, the allocated multicast group information to an underlying network element through a multicast service request, so as to trigger the underlying network element to create or update local multicast group information.

17. The method of claim 16, wherein the CSE is a CSE where a group is located, and the multicast group information comprises a multicast address, or a multicast address and an address type.

18. The method of claim 16, wherein the step in which the CSE transmits the allocated multicast group information to the underlying network element through the multicast service request comprises:

sending, by the CSE, a Group Message Request, which carries the multicast group information, to an underlying Network Services Entity (NSE), so as to transmit the multicast group information to the underlying network element through the NSE, wherein the Group Message Request further carrying an External Group ID.

19. A computer-readable storage medium, comprising a computer program which, when executed by one or more processors, cause the one or more processors to perform the method of claim 16.

* * * * *